US009568783B2

(12) United States Patent
Lee et al.

(10) Patent No.: US 9,568,783 B2
(45) Date of Patent: Feb. 14, 2017

(54) LIQUID CRYSTAL DISPLAY

(71) Applicant: Samsung Display Co., Ltd., Yongin-si, Gyeonggi-do (KR)

(72) Inventors: Se Hyun Lee, Seoul (KR); Ka Eun Kim, Yongin-si (KR); Cheol Shin, Hwaseong-si (KR); Hak Sun Chang, Yongin-si (KR); Ki Chul Shin, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/918,188

(22) Filed: Oct. 20, 2015

(65) Prior Publication Data

US 2016/0202568 A1 Jul. 14, 2016

(30) Foreign Application Priority Data

Jan. 8, 2015 (KR) ........................ 10-2015-0002970

(51) Int. Cl.
*G02F 1/1343* (2006.01)
*G02F 1/1368* (2006.01)
*G02F 1/1333* (2006.01)

(52) U.S. Cl.
CPC ....... *G02F 1/134309* (2013.01); *G02F 1/1368* (2013.01); *G02F 1/133345* (2013.01); *G02F 2001/134345* (2013.01)

(58) Field of Classification Search
CPC .................................................. G02F 1/1343
See application file for complete search history.

(56) References Cited

U.S. PATENT DOCUMENTS

| 2011/0157537 | A1 | 6/2011 | Chen et al. | |
|---|---|---|---|---|
| 2013/0002625 | A1* | 1/2013 | Liao | G02F 1/134309 345/205 |
| 2014/0063428 | A1* | 3/2014 | Lee | G02F 1/13439 349/139 |
| 2014/0132874 | A1* | 5/2014 | Jang | G02F 1/134309 349/44 |
| 2014/0168582 | A1* | 6/2014 | Chang | G02F 1/134309 349/106 |

(Continued)

FOREIGN PATENT DOCUMENTS

| KR | 10-2005-0112630 A | 12/2005 |
|---|---|---|
| KR | 10-2014-0021749 A | 2/2014 |
| KR | 10-2014-0097905 A | 8/2014 |

*Primary Examiner* — Timothy L Rude
(74) *Attorney, Agent, or Firm* — Innovation Counsel LLP

(57) ABSTRACT

Provided is a liquid crystal display including: a first insulation substrate; a thin film transistor positioned on the first insulation substrate; a first subpixel electrode positioned on the thin film transistor and to which a first voltage is applied; a second subpixel electrode positioned on the thin film transistor and to which a second voltage is applied; a second insulation substrate facing the first insulation substrate; a common electrode positioned on the second insulation substrate and receiving a common voltage; and a liquid crystal layer disposed between the first insulation substrate and the second insulation substrate, in which the first subpixel electrode includes a plate region and a minute branch region overlapping the plate region with a passivation layer between the plate region and the minute branch region, and the plate region and the second subpixel electrode are positioned on a same layer.

13 Claims, 20 Drawing Sheets

(56) References Cited

U.S. PATENT DOCUMENTS

| | | | |
|---|---|---|---|
| 2014/0211142 A1* | 7/2014 | Kim | G02F 1/133707 349/138 |
| 2014/0267962 A1* | 9/2014 | Jung | G02F 1/134363 349/33 |
| 2015/0098047 A1* | 4/2015 | Shin | G02F 1/133707 349/106 |
| 2016/0116804 A1* | 4/2016 | Kang | G02F 1/134309 349/43 |

* cited by examiner

LIQUID CRYSTAL DISPLAY

CROSS-REFERENCE TO RELATED APPLICATION

This application claims priority to and the benefit of Korean Patent Application No. 10-2015-0002970 filed in the Korean Intellectual Property Office on Jan. 8, 2015, the entire contents of which are incorporated herein by reference.

BACKGROUND (a) Field

The present invention relates to a liquid crystal display.

(b) Description of the Related Art

Liquid crystal displays are one of the most common types of flat panel displays currently in use. Liquid crystal displays include two sheets of display panels a liquid crystal layer interposed therebetween. The two sheets of display panels include field generating electrodes, such as a pixel electrode, a common electrode, and the like. The liquid crystal display generates an electric field in the liquid crystal layer by applying voltage to the field generating electrodes. The alignment of liquid crystal molecules of the liquid crystal layer is determined by the generated electric field, thus controlling polarization of incident light so as to display images.

One display panel of the liquid crystal display also includes a switching element connected to each pixel electrode, and a plurality of signal lines such as a gate line and a data line for applying voltage to the pixel electrode by controlling the switching element.

Among the liquid crystal displays, a vertically aligned mode liquid crystal display, in which long axes of liquid crystal molecules are aligned to be vertical to the display panels without applying the electric field, has received attention due to a large contrast and a wide reference viewing angle. Here, the reference viewing angle means a viewing angle or a luminance inversion limit angle between grays having a contrast ratio of 1:10.

In the case of the vertically aligned mode liquid crystal display, in order to provide side visibility that is approximately the same as the front visibility, a method of varying transmittance is proposed in which one pixel is divided into two subpixels and different voltages are applied to the two subpixels. However, as such, in the case of providing the side visibility that is approximately the same as the front visibility by dividing one pixel into two subpixels and varying the transmittance, luminance is increased at a low gray or a high gray, a gray expression at the side is difficult, and as a result, there is a problem in that image quality deteriorates.

The above information disclosed in this Background section is only for enhancement of understanding of the background of the invention and therefore it may contain information that does not form the prior art that is already known to a person of ordinary skill in the art.

SUMMARY

A liquid crystal display having advantages of enabling accurate gray expression in a low gray region and preventing transmittance from deteriorating while approximating side visibility to front visibility is provided.

In one aspect, a liquid crystal display includes: a first insulation substrate; a thin film transistor positioned on the first insulation substrate; a first subpixel electrode positioned on the thin film transistor and to which a first voltage is applied; a second subpixel electrode positioned on the thin film transistor and to which a second voltage is applied; a second insulation substrate facing the first insulation substrate; a common electrode positioned on the second insulation substrate and receiving a common voltage; and a liquid crystal layer disposed between the first insulation substrate and the second insulation substrate, in which the first subpixel electrode includes a plate region and a minute branch region overlapping the plate region with a passivation layer between the plate region and the minute branch region, and the plate region and the second subpixel electrode are positioned on a same layer.

The minute branch region may include a horizontal stem, a vertical stem orthogonal to the horizontal stem, and first minute branches obliquely extended from the horizontal stem and the vertical stem.

The plate region may include a first plate portion and a connection portion positioned on the same line as the vertical stem.

A plane of the second subpixel electrode and the plate region may be a rectangle.

The second subpixel electrode may include a second plate portion and a plurality of minute branches extended from the second plate portion.

The connection portion may be surrounded by the second plate portion.

An end of the vertical stem of the minute branch region may be extended to coincide with one end of the connection portion of the plate region.

A length of the vertical stem positioned in the second region may be 30 μm or less.

The first subpixel electrode and second subpixel electrode from one pixel area, and one pixel area may include a first region in which the minute branch region of the first subpixel electrode and a part of the first plate portion overlap with each other, a second region in which the rest of the first plate portion of the first subpixel electrode is positioned, and a third region in which the second subpixel electrode is positioned.

A voltage difference from the common electrode may be reduced in the order of the first region, the second region, and the third region.

The plate region of the first subpixel electrode is positioned below the passivation layer, and the minute branch region of the first subpixel electrode is positioned on the passivation layer.

The plate region and the minute branch region of the first subpixel electrode may be connected to each other through a contact hole.

The first voltage may be larger than the second voltage.

According to the example embodiment, it is possible to enable accurate gray expression in a low gray region and prevent transmittance from deteriorating while approximating side visibility to front visibility.

DETAILED DESCRIPTION OF THE EMBODIMENTS

Figure 1:
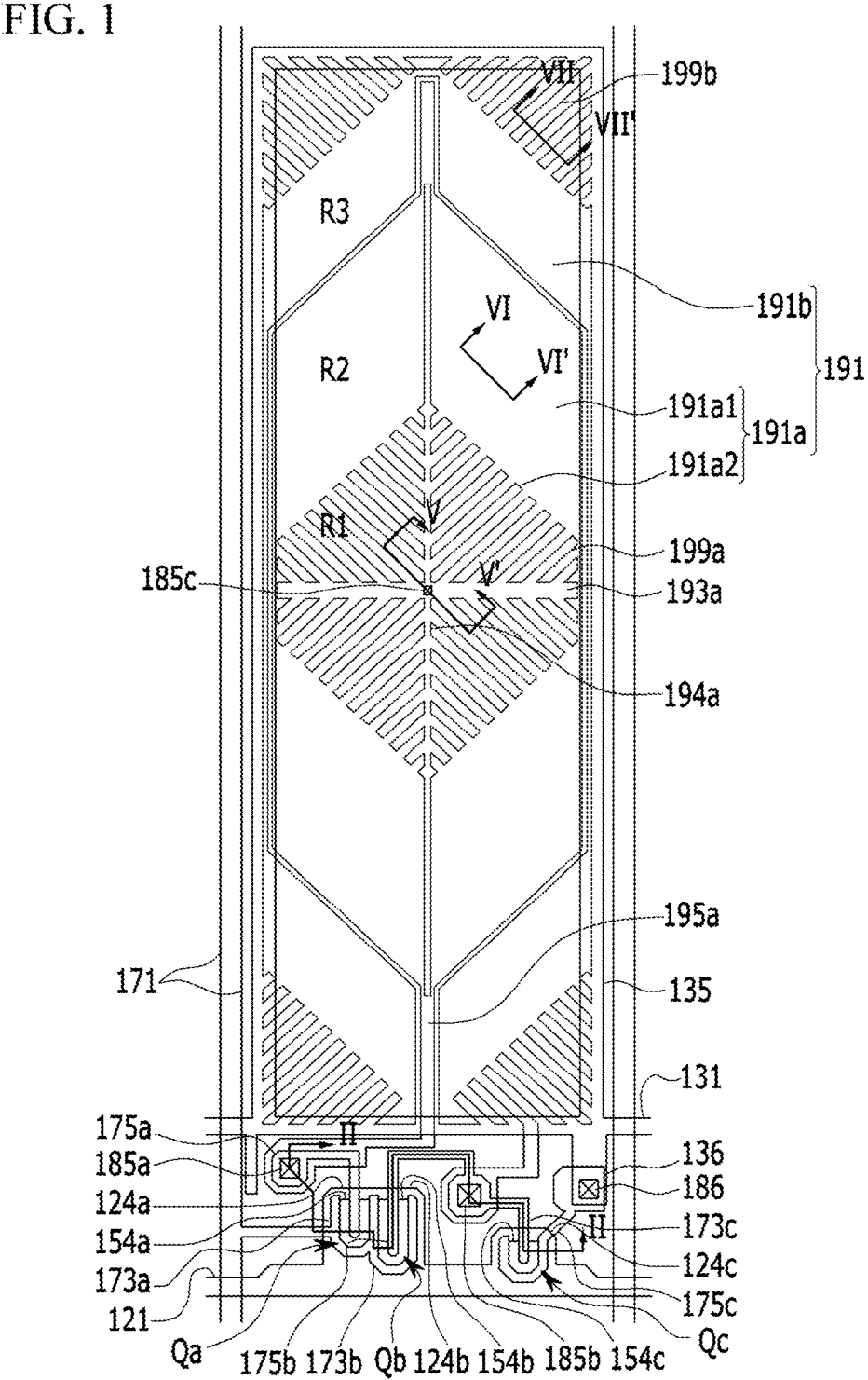
FIG. 1 is a plan view of one pixel according to an example embodiment.

Hereinafter, example embodiments will be described in detail with reference to the accompanying drawings. As those skilled in the art would realize, the described embodiments may be modified in various different ways, all without departing from the spirit or scope of the present invention.

In the drawings, the thickness of layers, films, panels, regions, etc., are exaggerated for clarity. It will be understood that when a layer is referred to as being "on" another layer or substrate, it can be directly on the other layer or substrate, or intervening layers or substrates may also be present. Like reference numerals designate like elements throughout the specification.

Figure 3:
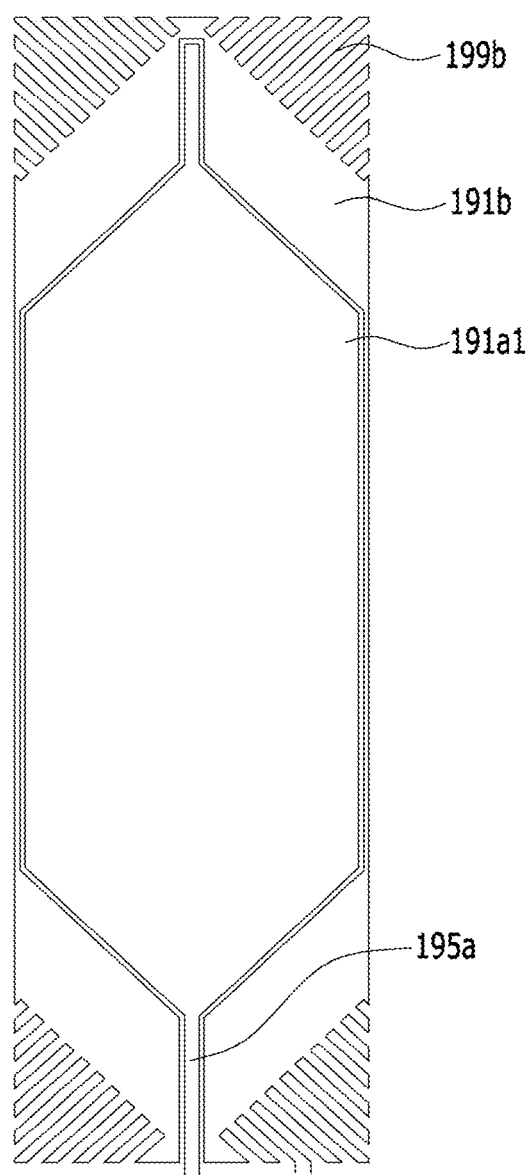
FIG. 3 is a plan view illustrating a part of a first subpixel electrode and a second subpixel electrode according to the example embodiment.
Figure 4:
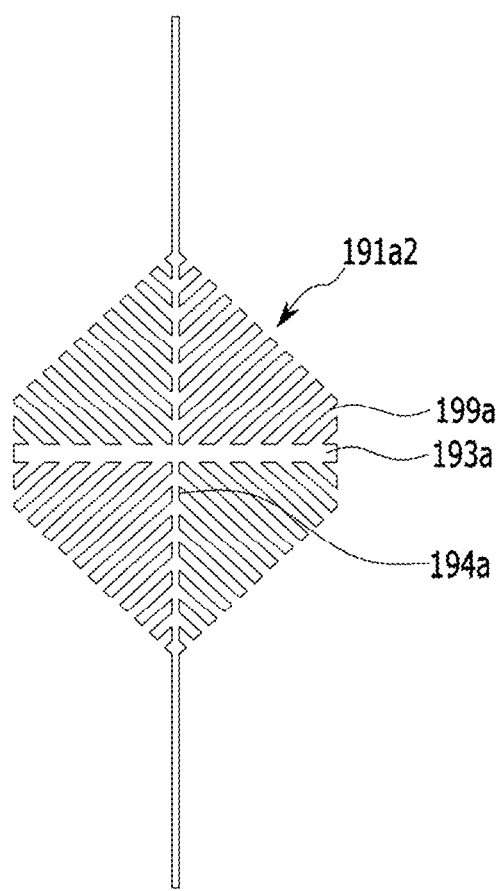
FIG. 4 is a plan view of a part of the first subpixel electrode according to the example embodiment.
Figure 5:
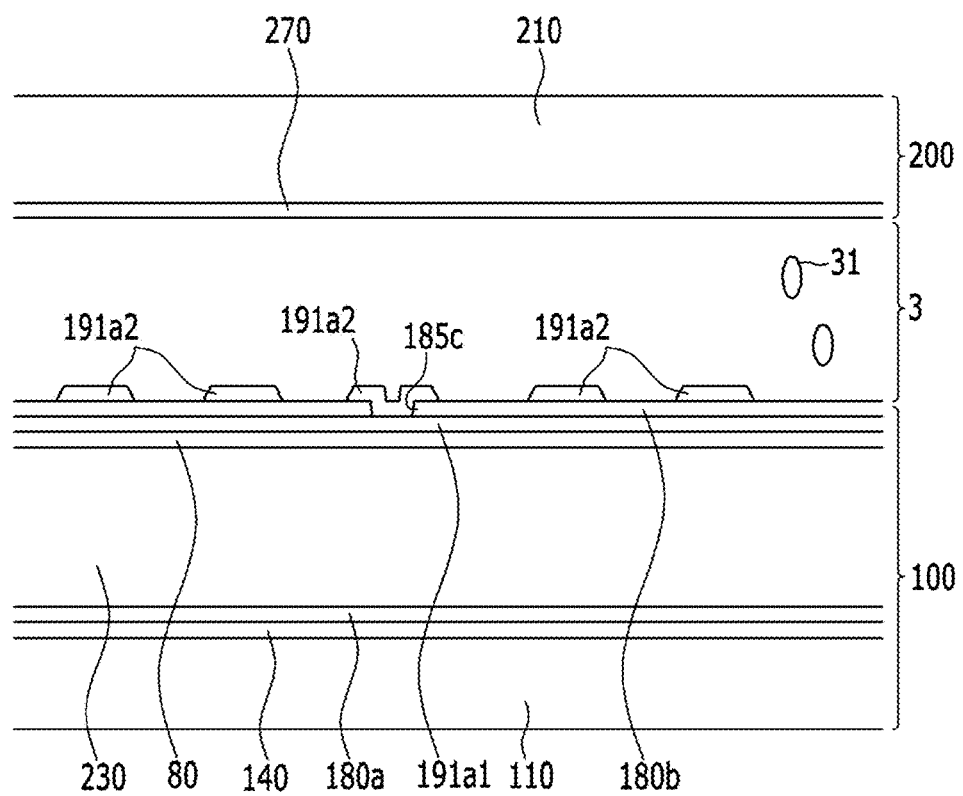
FIG. 5 is a cross-sectional view of FIG. 1 taken along line V-V.
Figure 6:
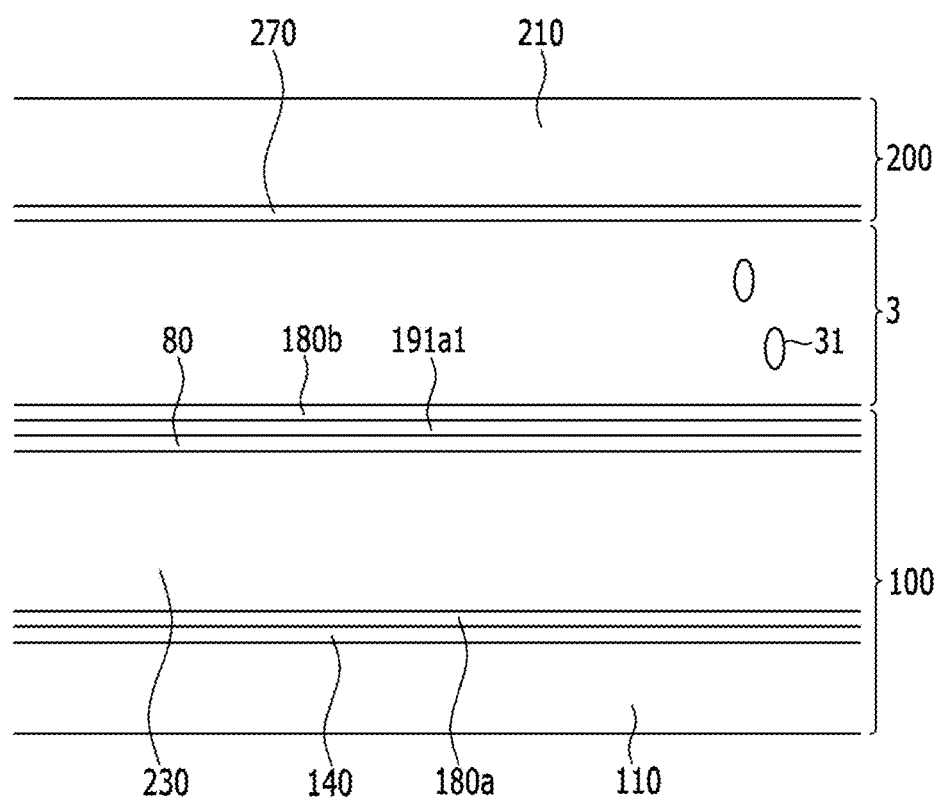
FIG. 6 is a cross-sectional view of FIG. 1 taken along line VI-VI.
Figure 7:
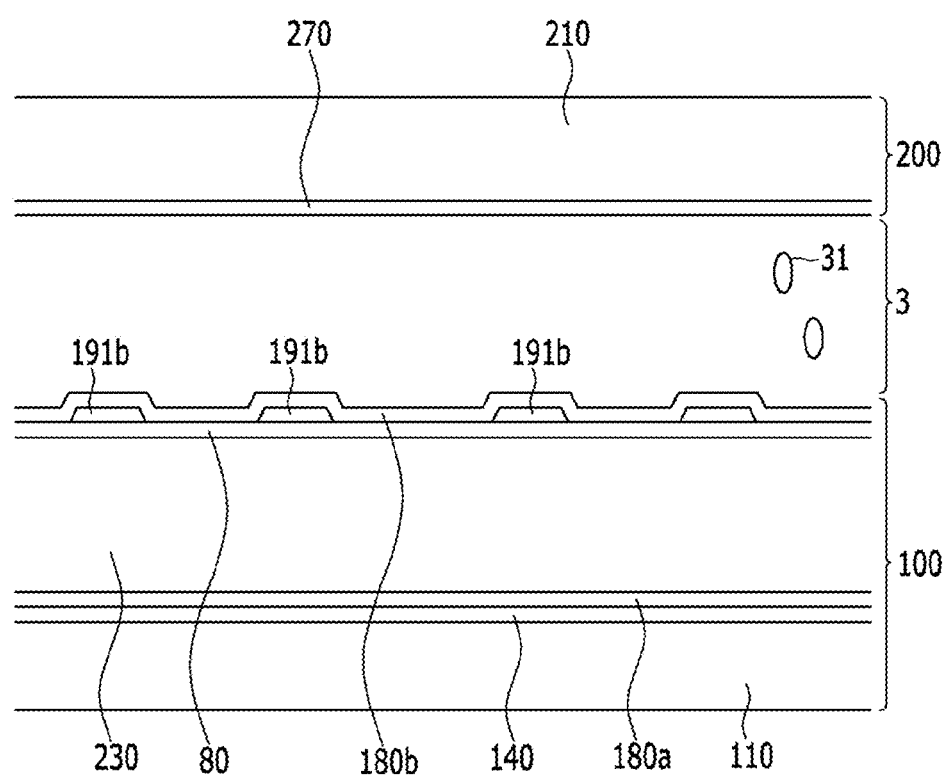
FIG. 7 is a cross-sectional view of FIG. 1 taken along line VII-VII.

Hereinafter, a liquid crystal display according to an example embodiment will be described with reference to FIGS. 1 to 7. FIG. 1 is a plan view of one pixel according to an example embodiment, FIG. 2 is a cross-sectional view of FIG. 1 taken along line II-II, FIG. 3 is a plan view illustrating a part of a first subpixel electrode and a second subpixel electrode according to an example embodiment, FIG. 4 is a plan view of a part of the first subpixel electrode according to an example embodiment, FIG. 5 is a cross-sectional view of FIG. 1 taken along line V-V, FIG. 6 is a cross-sectional view of FIG. 1 taken along line VI-VI, and FIG. 7 is a cross-sectional view of FIG. 1 taken along line VII-VII.

Figure 2:
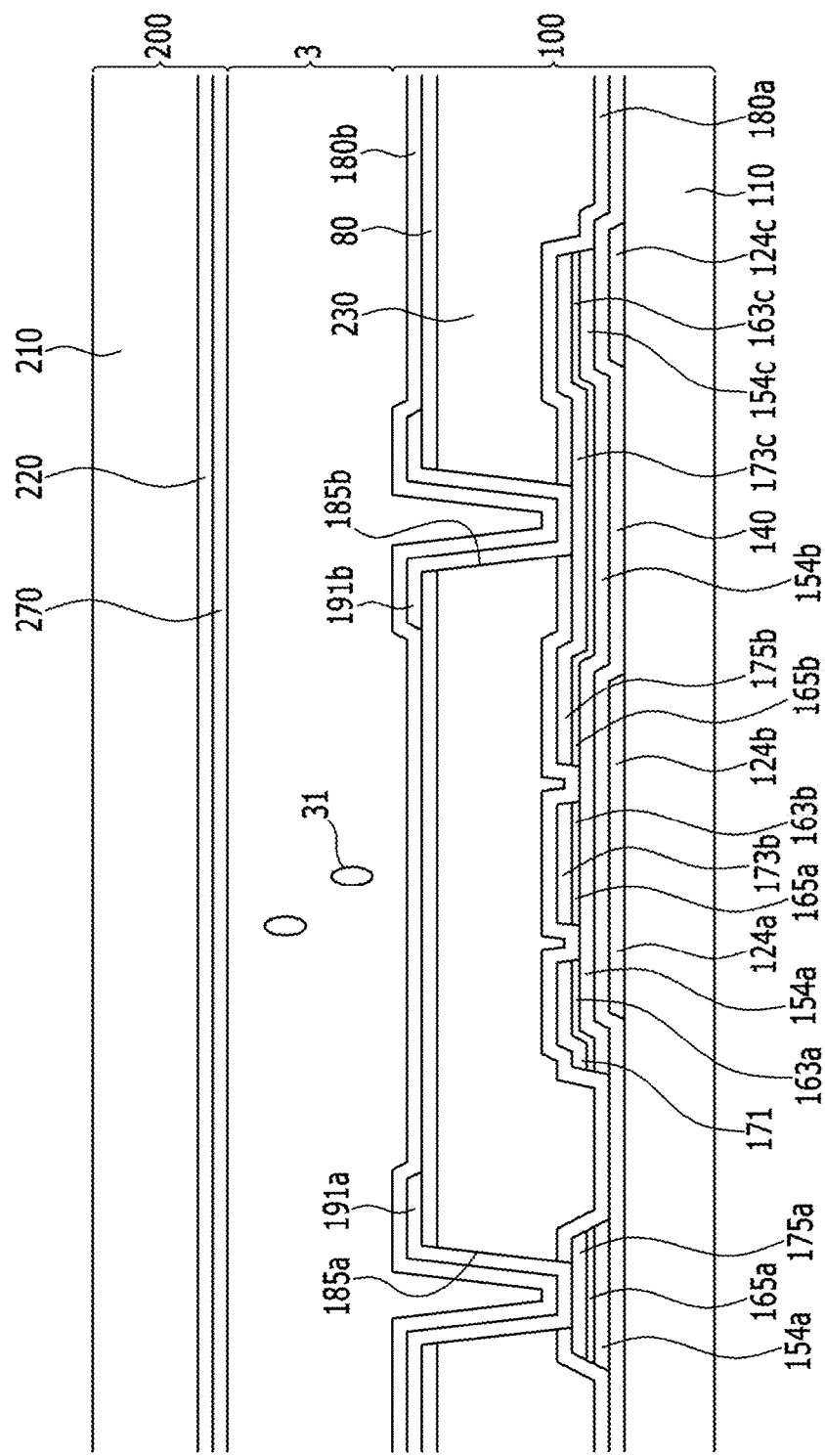
FIG. 2 is a cross-sectional view of FIG. 1 taken along line II-II.

First, referring to FIGS. 1 and 2, a liquid crystal display according to an example embodiment includes a lower panel 100 and an upper panel 200 facing each other, and a liquid crystal layer 3 interposed between the two panels 100 and 200.

First, the lower panel 100 will be described.

A gate line 121, a reference voltage line 131, and a storage electrode 135 are formed on an insulation substrate 110 made of transparent glass or plastic. The gate line 121 mainly extends in a horizontal direction and transfers a gate signal.

The gate line 121 includes a first gate electrode 124a, a second gate electrode 124b, a third gate electrode 124c, and a wide end portion (not illustrated) for connection with another layer or an external driving circuit.

The reference voltage line 131 may extend in parallel with the gate line 121 and has an extension 136, and the extension 136 is connected with a third drain electrode 175c to be described below.

The reference voltage line 131 includes the storage electrode 135 surrounding a pixel area.

A gate insulating layer 140 is positioned on the gate line 121, the reference voltage line 131, and the storage electrode 135.

A first semiconductor layer 154a, a second semiconductor layer 154b, and a third semiconductor layer 154c, which may be made of amorphous or crystalline silicon, are positioned on the gate insulating layer 140.

A plurality of ohmic contacts 163a, 163b, 163c, 165a, 165b, and 165c are positioned on the first semiconductor layer 154a, the second semiconductor layer 154b, and the third semiconductor layer 154c. In the case where the semiconductors 154a, 154b, and 154c are oxide semiconductors, the ohmic contacts may be omitted.

A data conductor 171, 173a, 173b, 173c, 175a, 175b, and 175c including a data line 171 including a first source electrode 173a and a second source electrode 173b, a first drain electrode 175a, a second drain electrode 175b, a third source electrode 173c, a third drain electrode 175c is formed on the ohmic contacts 163a, 165a, 163b, 165b, 163c, and 165c and the gate insulating layer 140.

The second drain electrode 175b is connected with the third source electrode 173c.

The first gate electrode 124a, the first source electrode 173a, and the first drain electrode 175a form a first thin film transistor Qa together with a first semiconductor layer 154a, and a channel of the first thin film transistor is formed in the semiconductor portion 154a between the first source electrode 173a and the first drain electrode 175a. Similarly, the second gate electrode 124b, the second source electrode 173b, and the second drain electrode 175b forms a second thin film transistor Qb together with the second semiconductor layer 154b, and a channel of the second thin film transistor is formed in the semiconductor portion 154b between the second source electrode 173b and the second drain electrode 175b. The third gate electrode 124c, the third source electrode 173c, and the third drain electrode 175c forms a third thin film transistor Qc together with the third semiconductor layer 154c, and a channel of the third thin film transistor is formed in the semiconductor portion 154c between the third source electrode 173c and the third drain electrode 175c.

A first passivation layer 180a made of an inorganic insulating material such as silicon nitride or silicon oxide is positioned on the data conductor 171, 173a, 173b, 173c, 175a, 175b, 175c and the exposed portions of the semiconductors 154a, 154b, and 154c.

Color filters 230 are positioned on the first passivation layer 180a.

A light blocking member (not illustrated) may be positioned on a region where the color filters 230 are not positioned and a part of the color filters 230. The light blocking member is called a black matrix and blocks light leakage.

A capping layer 80 is positioned on the color filter 230. The capping layer 80 may prevent the color filters 230 from being lifted and suppress the contamination of the liquid crystal layer 3 due to an organic material such as a solvent flowing from the color filter 230, thereby preventing defects such as an afterimage which may be caused when a screen is driven.

A plate region 191a1 of a first subpixel electrode 191a and a second subpixel electrode 191b are positioned on the capping layer 80. The plate region 191a1 of the first subpixel electrode 191a and the second subpixel electrode 191b are positioned on the same layer and may be formed through the same process with the same material. A planar shape of the plate region 191a1 of the first subpixel electrode 191a and the second subpixel electrode 191b may be a rectangle corresponding to one pixel.

Referring to FIG. 3, the plate region 191a1 of the first subpixel electrode 191a may have a hexagonal planar shape elongated in a vertical direction, and may further include a connection portion 195a extended in a vertical direction.

In this specification, the plate region 191a1 having the hexagonal planar shape is described, but is not limited thereto, and may have any shape forming a rectangular plane with the second subpixel electrode 191b.

The connection portion 195a of the first subpixel electrode 191a may be positioned on the same line as a vertical stem 194a of the first subpixel electrode 191a. That is, in one pixel, the connection portion 195a of the first subpixel electrode 191a may be formed in a vertical direction. Further, the connection portion 195a is extended in one direction to overlap with the first contact hole 185a and may contact the first drain electrode 175a.

The plate region 191a1 of the first subpixel electrode 191a may be surrounded by the second subpixel electrode 191b, and the connection portion 195a of the first subpixel electrode 191a may be surrounded by a plate portion of the second subpixel electrode 191b.

The second subpixel electrode 191b is positioned around the first subpixel electrode 191a to surround the first subpixel electrode 191a and has a planar shape including four parallelograms surrounding the plate region.

Further, the second subpixel electrode 191b includes a plurality of second minute branches 199b extended in an oblique direction from the plated parallelogram. The second minute branch 199b may be parallel with a first minute branch 199a of the first subpixel electrode 191a.

The second subpixel electrode 191b may be divided into four domains in an extending direction of the second minute branch 199b, and each domain includes a plate portion having a trapezoidal planar shape and a second minute branch 199b positioned outside the plate portion and extending in a parallel direction with the plurality of first minute branches 199a. The plate means a whole plate shape which is not split as it is.

A second passivation layer 180b is positioned on the plate region 191a1 of the first subpixel electrode 191a and the second subpixel electrode 191b. A minute branch region 191a2 of the first subpixel electrode 191a is positioned on the second passivation layer 180b.

Referring to FIG. 4, the minute branch region 191a2 of the first subpixel electrode 191a includes cross stems 193a and 194a positioned at the center of one pixel, and plurality of first minute branches 199a extended from the cross stems 193a and 194a in an oblique direction.

In detail, the minute branch region 191a2 of the first subpixel electrode 191a is positioned at the center of one pixel, and an overall shape is a diamond. The minute branch region 191a2 of the first subpixel electrode 191a includes cross stems 193a and 194a including a horizontal stem 193a and a vertical stem 194a vertical to the horizontal stem 193a, and a plurality of first minute branches 199a protruding from the cross stems 193a and 194a. The plurality of first minute branches 199a extends in four different directions.

The vertical stem 194a of the first subpixel electrode 191a may overlap with the plate region 191a1 of the first subpixel electrode 191a. In detail, one end of the connection portion 195a extended from the plate region 191a1 of the first subpixel electrode 191a may coincide with the end of the vertical stem 194a, and one end starting from the connection portion 195a and the end of the vertical stem 194a coincide with each other. In this case, the length of the vertical stem 194a may be about 30 μm or less. When the length is larger than 30 μm, because it is difficult to control the liquid crystal molecules, a texture is generated.

In the first passivation layer 180a and the capping layer 80, a first contact hole 185a exposing a part of the first drain electrode 175a and a second contact hole 185b exposing a part of the second drain electrode 175b are formed. Further, a third contact hole 185c (FIG. 1) exposing the center of the plate region 191a1 of the first subpixel electrode 191a is formed in the second passivation layer 180b.

The plate region 191a1 of the first subpixel electrode 191a is physically and electrically connected to the first drain electrode 175a through the first contact hole 185a, and the second subpixel electrode 191b is physically and electrically connected to the second drain electrode 175b through the second contact hole 185b. Further, the minute branch region 191a2 of the first subpixel electrode 191a is physically and electrically connected to the plate region 191a1 of the first subpixel electrode 191a through the third contact hole 185c formed in the second passivation layer 180b.

The first subpixel electrode 191a and the second subpixel electrode 191b receive data voltages corresponding to a first voltage and a second voltage from the first drain electrode 175a and the second drain electrode 175b through the first contact hole 185a and the second contact hole 185b, respectively.

Next, the upper panel 200 will be described.

A light blocking member 220 (FIG. 2) and a common electrode 270 are positioned on an insulation substrate 210 made of transparent glass, plastic, or the like.

However, in the case of a liquid crystal display according to another example embodiment, the light blocking member 220 may be positioned on the lower panel 100, and in the case of the liquid crystal display according to another example embodiment, a color filter may be positioned on the upper panel 200.

Alignment layers (not illustrated) are formed on inner surfaces of the display panels 100 and 200, and may be vertical alignment layers.

Polarizers (not illustrated) are provided on outer surfaces of the two panels 100 and 200, and transmissive axes of the two polarizers are orthogonal to each other, and one transmissive axis thereof may be parallel to the gate line 121. However, the polarizer may be disposed only on the outer side of any one of the two panels 100 and 200.

The liquid crystal layer 3 has negative dielectric anisotropy, and the liquid crystal molecules of the liquid crystal layer 3 are aligned so that long axes thereof are vertical to the surfaces of the two panels 100 and 200 while the electric field is not applied. Accordingly, incident light does not pass through an orthogonal polarizer, but is blocked while the electric field is not applied.

At least one of the liquid crystal layer 3 and the alignment layer may include a photo-reactive material, more particularly, reactive mesogen, and may be omitted.

Next, a driving method of the liquid crystal display according to an example embodiment will be briefly described.

When a gate-on signal is applied to the gate line 121, the gate-on signal is applied to the first gate electrode 124a, the second gate electrode 124b, and the third gate electrode 124c, and as a result, a first switching element Qa, second switching element Qb, and a third switching element Qc are turned on. Accordingly, the data voltages applied to the data line 171 are applied to the first subpixel electrode 191a and the second subpixel electrode 191b through the turned-on first switching element Qa and second switching element Qb, respectively. In this case, the voltages having the same magnitude are applied to the first subpixel electrode 191a and the second subpixel electrode 191b. However, the voltage applied to the second subpixel electrode 191b is divided through the third switching element Qc which is connected with the second switching element Qb in series. Accordingly, the voltage applied to the second subpixel electrode 191b is smaller than the voltage applied to the first subpixel electrode 191a.

Referring back to FIG. 1, one pixel area of the liquid crystal display according to an example embodiment includes a first region R1 in which the minute branch region 191a2 and the plate region 191a1 of the first subpixel electrode 191a overlap with each other, a second region R2 in which the rest of the plate region 191a1 of the first subpixel electrode 191a is positioned, and a third region R3 in which the second subpixel electrode 191b is positioned.

Each of the first region R1, the second region R2, and the third region R3 includes four domains.

Next, the first region R1, the second region R2, and the third region R3 included in one pixel area of the liquid crystal display according to an example embodiment will be described with reference to FIGS. 5 to 7.

Referring to FIG. 5, in the first region R1 included in one pixel of the liquid crystal display according to an example embodiment, the minute branch region 191a2 of the first subpixel electrode 191a positioned on the lower panel 100 and connected with the plate region 191a1 of the first subpixel electrode 191a and the common electrode 270 positioned on the upper panel 200 generate an electric field.

In this case, the minute branch region 191a2 of the first subpixel electrode 191a includes cross stems 193a and 194a and a plurality of first minute branches 199a extending in four different directions.

The plurality of first minute branches 199a may be tilted at about 40° to about 50° based on the gate line 121. By a fringe field generated by the edges of the plurality of first minute branches, the liquid crystal molecules of the liquid crystal layer 3 positioned in the first region R1 are tilted in four different directions. In more detail, because a horizontal component of the fringe field generated at the edges of the plurality of first minute branches is substantially horizontal to the sides of the plurality of first minute branches, the liquid crystal molecules are tilted in a parallel direction to a length direction of the plurality of first minute branches 199a.

In the first region R1, the minute branch region 191a2 of the first subpixel electrode 191a and a part of the plate region 191a1 of the first subpixel electrode 191a overlap with each other. However, the minute branch region 191a2 and the plate region 191a1 are electrically connected to each other to receive the same voltage, and the electric field generated between the minute branch region 191a2 of the first subpixel electrode 191a and the common electrode 270 is not influenced by the plate region 191a1. Accordingly, in the first region, by the electric field generated between the minute branch region 191a2 of the first subpixel electrode 191a and the common electrode 270, the liquid crystal molecules of the liquid crystal layer 3 are aligned.

Referring to FIG. 6, in the second region R2 of one pixel of the liquid crystal display according to an example embodiment, the plate region 191a1 is positioned on the lower panel 100. A part of the plate region 191a1 is positioned in the first region R1 and overlaps with the minute branch region 191a2, but the plate region 191a1 positioned in the second region R2 does not overlap with another subpixel electrode. The plate region 191a1 which does not overlap with another subpixel electrode includes four domains having a parallelogram.

Next, referring to FIG. 7, in the third region R3 of one pixel of the liquid crystal display according to an example embodiment, an electric field is generated between the second subpixel electrode 191b positioned on the lower panel 100 and the common electrode 270 positioned on the upper panel 200.

In this case, a part of the second subpixel electrode 191b has a plate shape, and the rest of the second subpixel electrode 191b includes a plurality of second minute branches 199b. As such, the second subpixel electrode 191b having the plate shape is included, thereby increasing transmittance of the liquid crystal display.

As described above, the magnitude of the second voltage applied to the second subpixel electrode 191b is smaller than the magnitude of the first voltage applied to the first subpixel electrode 191a.

Accordingly, the intensity of the electric field applied to the liquid crystal layer positioned in the first region R1 is the largest, and the intensity of the electric field applied to the liquid crystal layer positioned in the third region R3 is the smallest. In the second region R2, the plate region 191a1 of the first subpixel electrode 191a is positioned below the passivation layer 180b, and the intensity of the electric field applied to the liquid crystal layer positioned in the second region R2 is smaller than the intensity of the electric field applied to the liquid crystal layer positioned in the first region R1 and larger than the intensity of the electric field applied to the liquid crystal layer positioned in the third region R3.

As such, in the liquid crystal display according to an example embodiment, one pixel area is divided into a first region in which the first subpixel electrode to which a first voltage relatively high is applied is positioned, a second region in which the same voltage is applied but the effect of the electric field is reduced by the passivation layer, and a third region in which the second subpixel electrode to which the relatively low second voltage is applied is positioned.

Accordingly, the intensities of the electric field applied to the liquid crystal molecules corresponding to the first region, the second region, and the third region are different from each other, tilted angles of the liquid crystal molecules are different from each other, and as a result, luminance of each region varies. As such, because one pixel area is divided into three regions having different luminance to gradually control a change in transmittance according to a gray, the transmittance according to a gray change even in the low gray and the high gray is prevented from being rapidly changed at the side view. As a result, even while the side visibility is approximately the same as the front visibility, it is possible to enable accurate gray expression even with the low gray and the high gray.

Because the first region, the second region, and the third region forming one pixel area are not spaced apart from each other, transmittance which may be generated in a region between the first subpixel electrode and the second subpixel electrode may be prevented from deteriorating, and as a result, the entire transmittance is increased.

Figure 8:
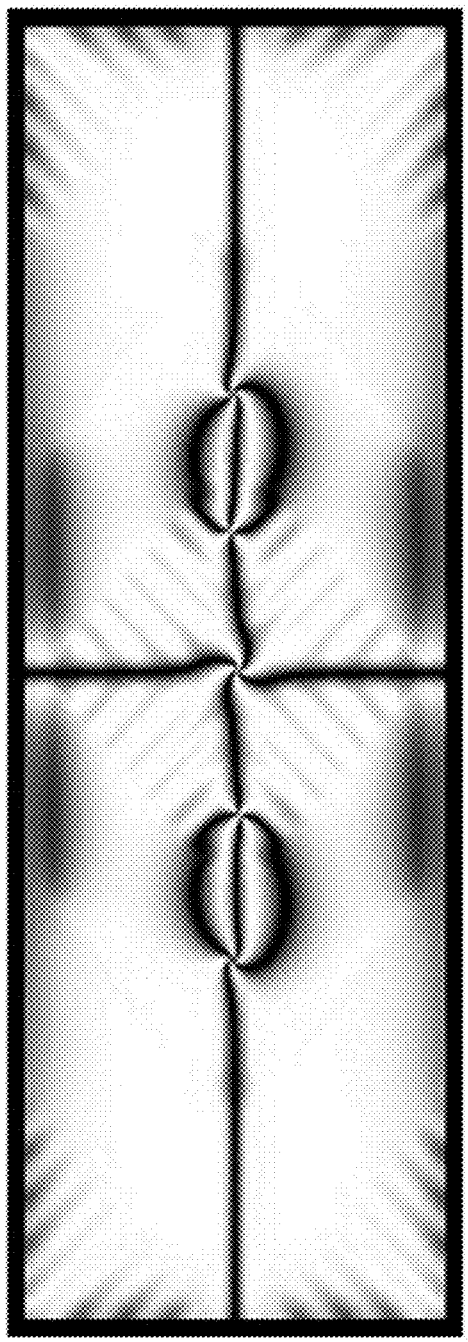
FIG. 8 is an image of one pixel according to a Comparative Example.
Figure 10A:
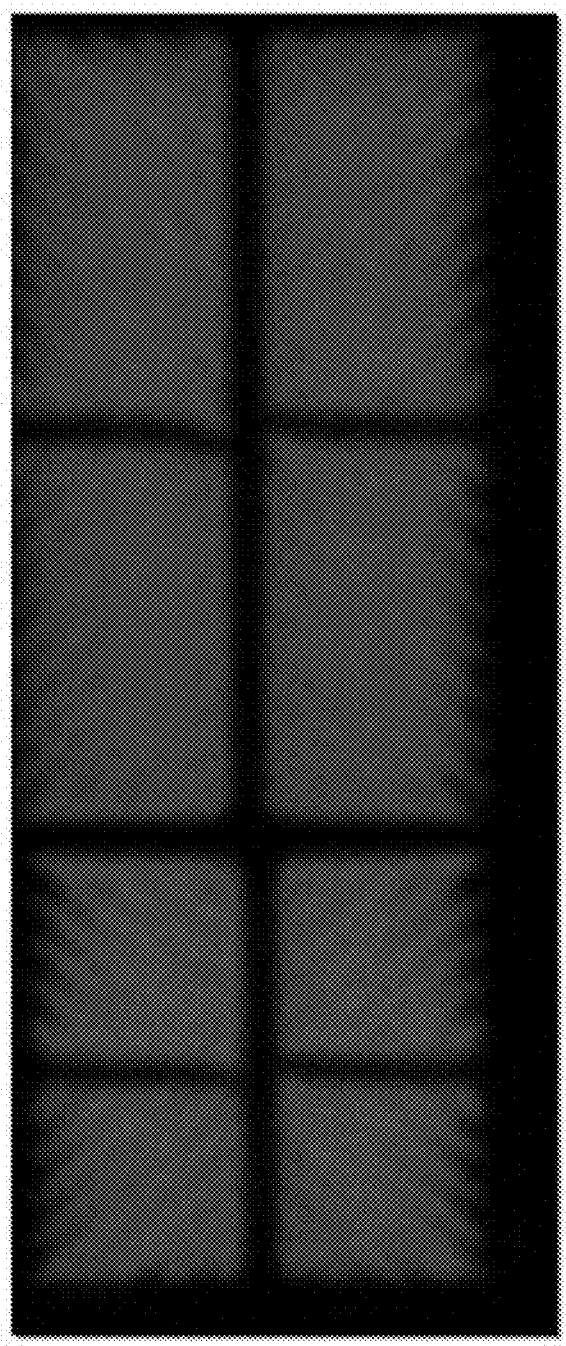
FIGS. 10A and 10B are images according to misalignment of one pixel according to the Comparative Example.
Figure 10B:
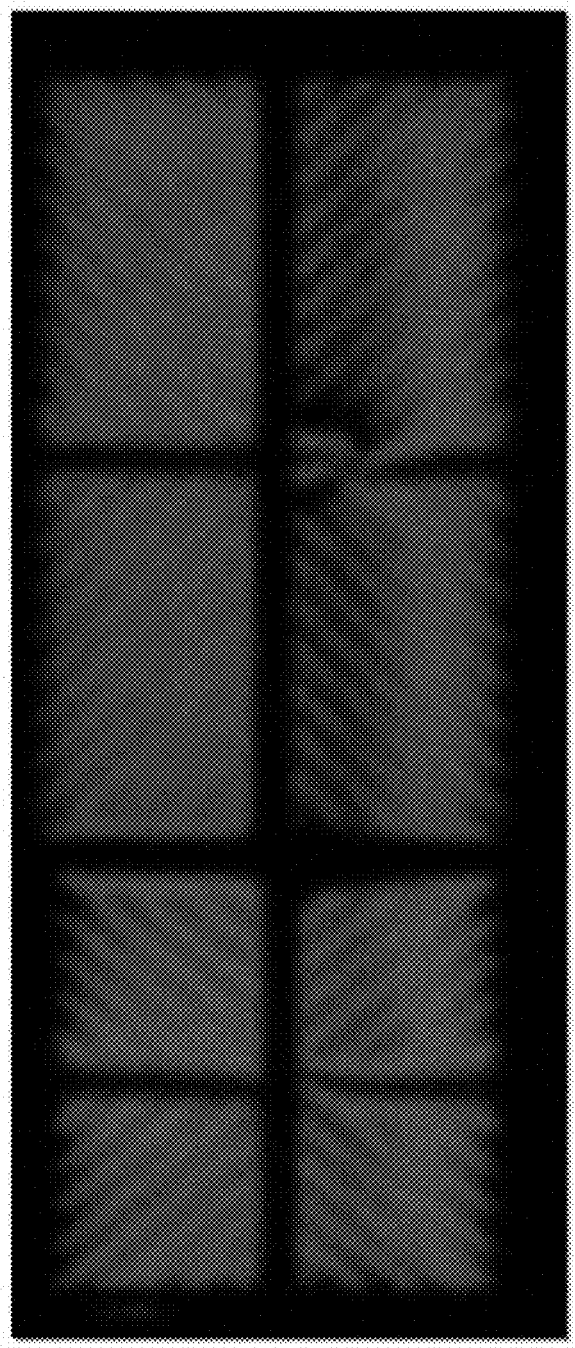
Figure 11A:
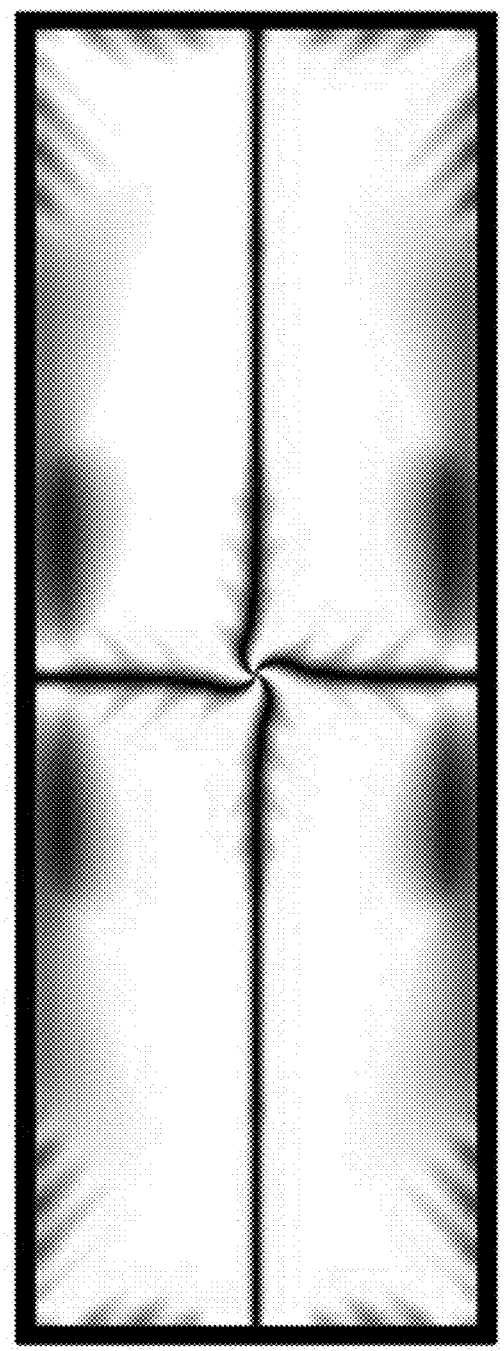
FIGS. 11A and 11B are pixel images according to misalignment of one pixel according to the Example.
Figure 11B:
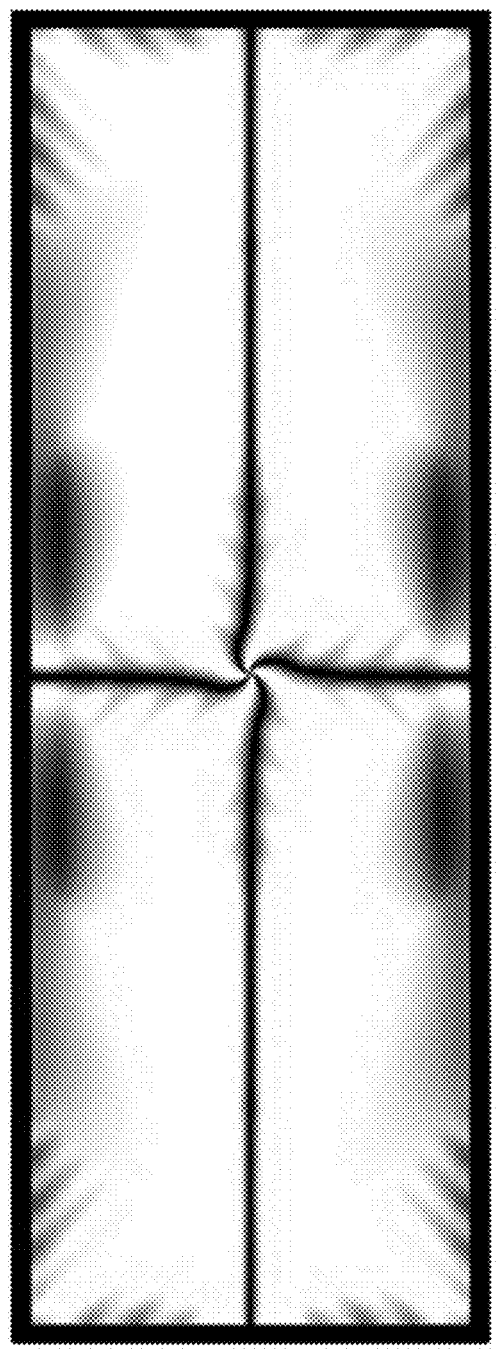
Figure 12A:
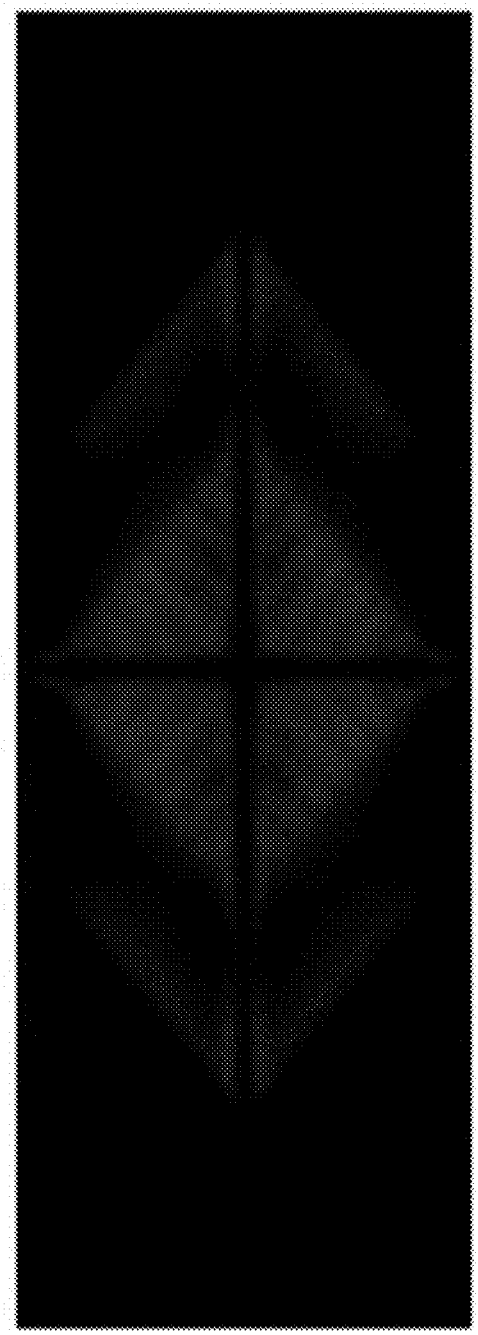
FIGS. 12A, 12B and 12C are images according to one pixel according to the Example of the present invention.
Figure 12B:
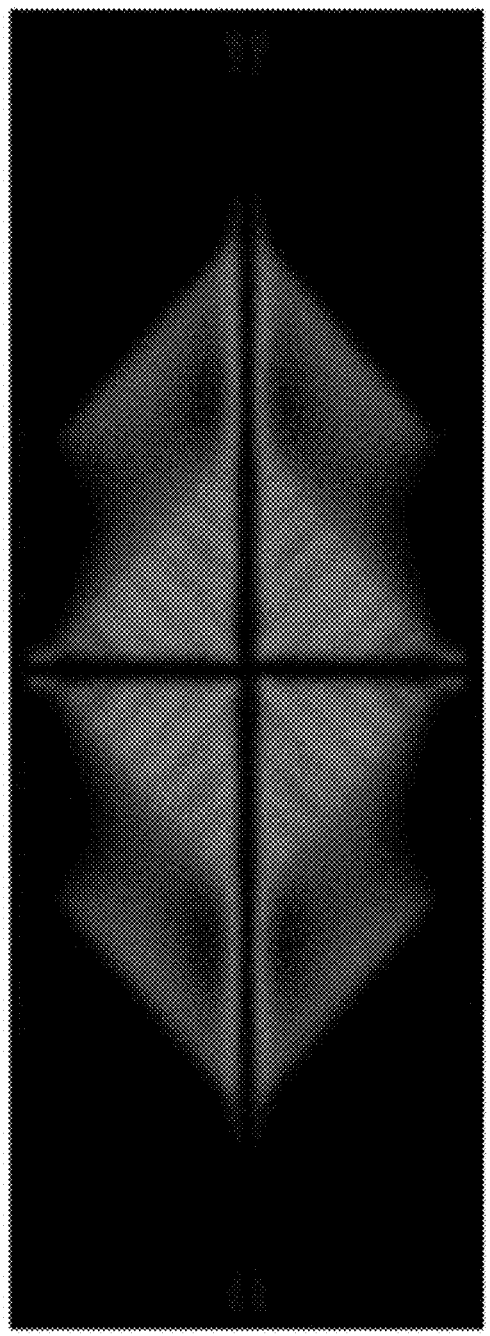
Figure 12C:
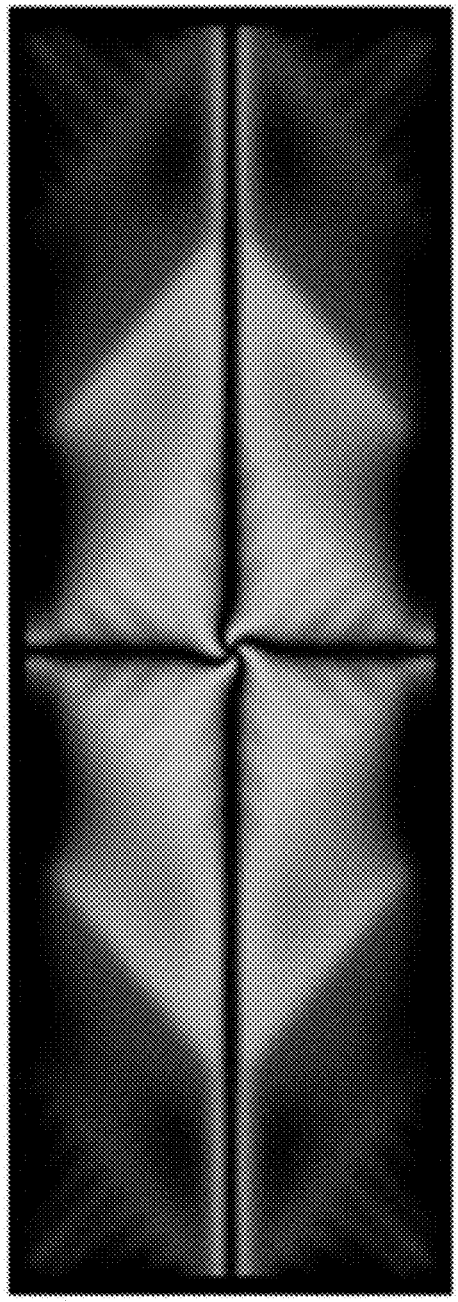
Figure 13A:
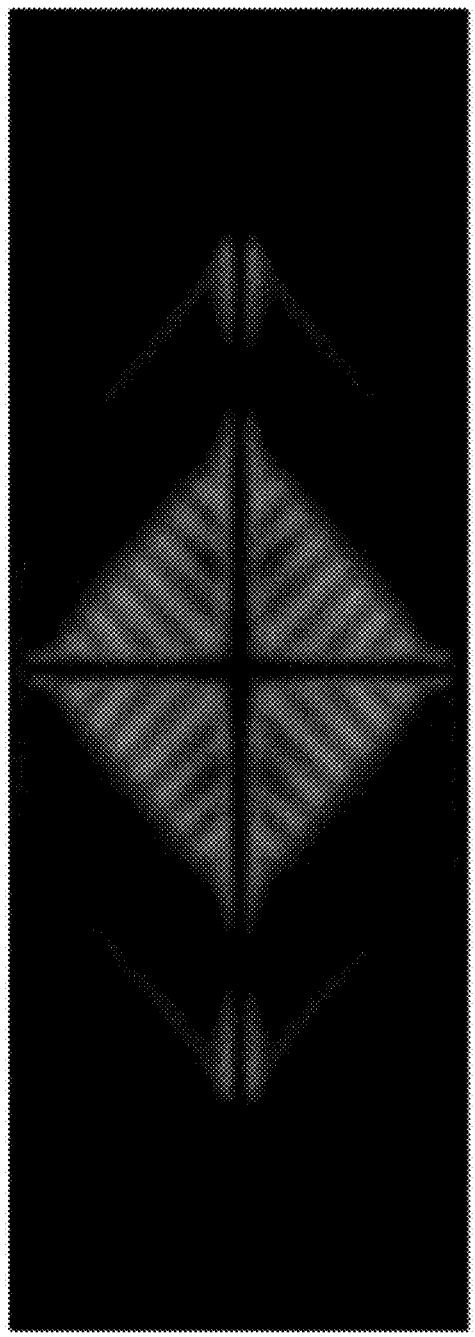
FIGS. 13A, 13B, and 13C are images according to one pixel according to the Example.
Figure 13B:
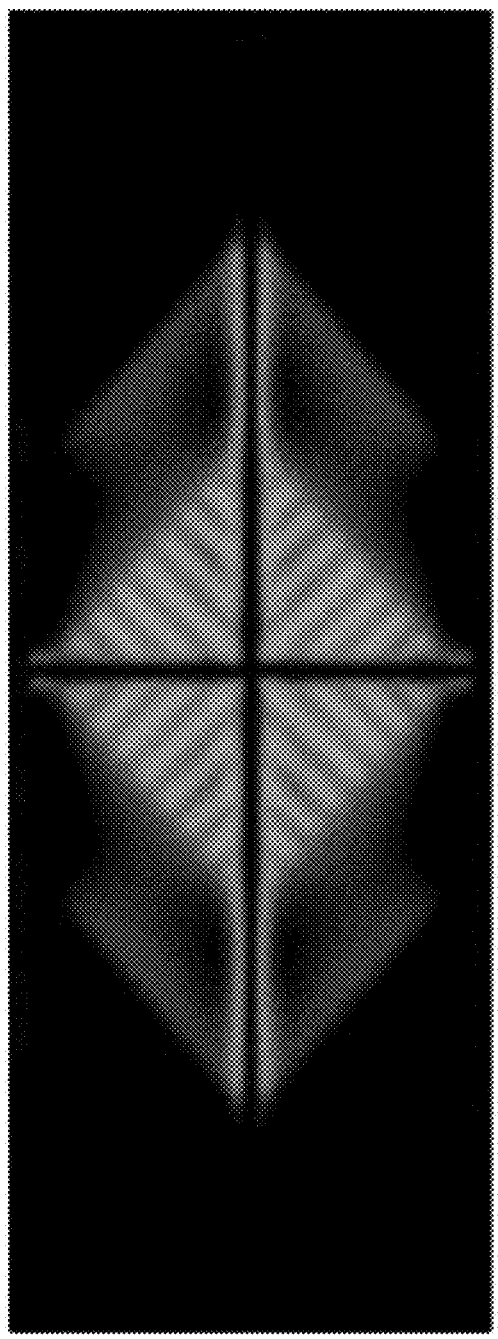
Figure 13C:
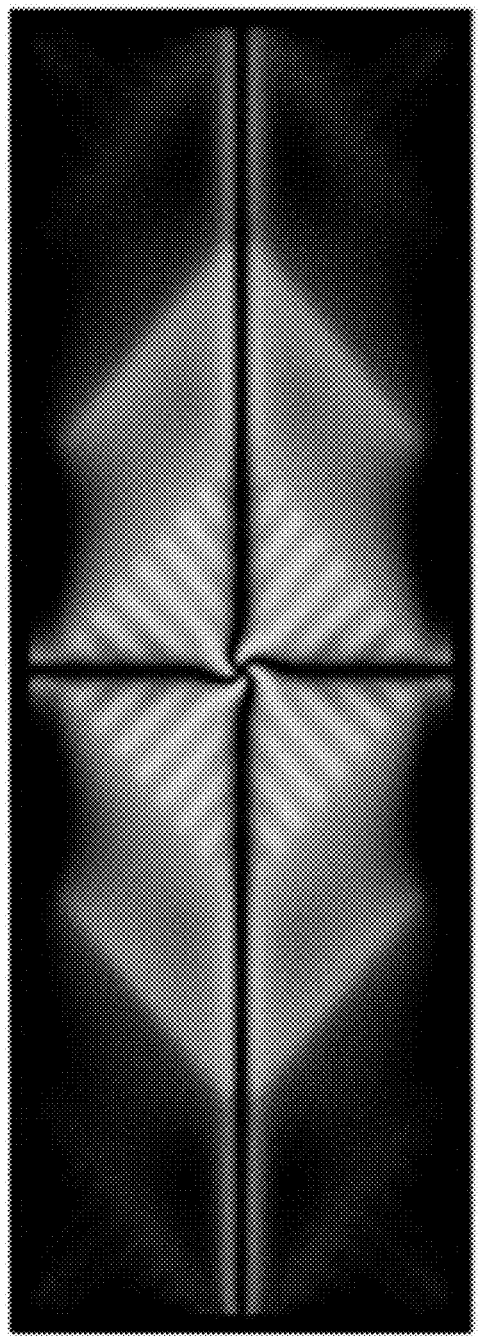
Figure 14:
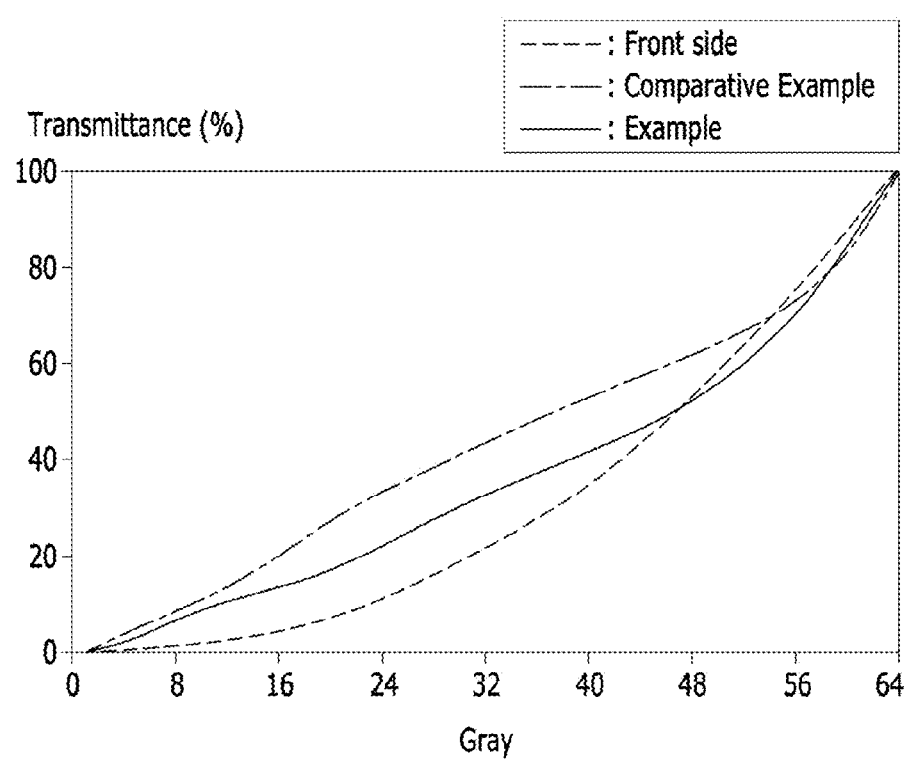
FIG. 14 is a transmittance graph with respect to the Example of the present disclosure and the Comparative Example.

Hereinafter, the liquid crystal display according to an example embodiment of the present invention will be described with reference to FIGS. 8 to 14. FIG. 8 is an image of one pixel according to a Comparative Example, and FIG. 9 is an image of one pixel according to an Example of the present disclosure, FIGS. 10A and 10B are images according to misalignment of one pixel according to the Comparative Example, and FIGS. 11A and 11B are pixel images according to misalignment of one pixel according to the Example of the present disclosure, FIGS. 12A to 12C are images according to one pixel according to the Example of the present disclosure, and FIGS. 13A to 13C are images according to one pixel according to the Example of the present disclosure, and FIG. 14 is a transmittance graph with respect to the Example of the present disclosure and the Comparative Example.

First, FIG. 8 illustrates the Comparative Example, in detail, a case where the plate region overlapping with the minute branch region of the first subpixel electrode is not the plate. The plate region includes an opening with respect to the region where the minute branch region of the first subpixel electrode is positioned.

Referring to FIG. 8, in one pixel according to the Comparative Example, texture is significantly generated at the end portion of the minute branch region of the first subpixel electrode. The reason for this is that the liquid crystal molecules positioned around the end portion are controlled in different directions by collision of the fringe field formed by the minute branch region of the first subpixel electrode and the fringe field formed by the plate region of the first subpixel electrode.

Figure 9:
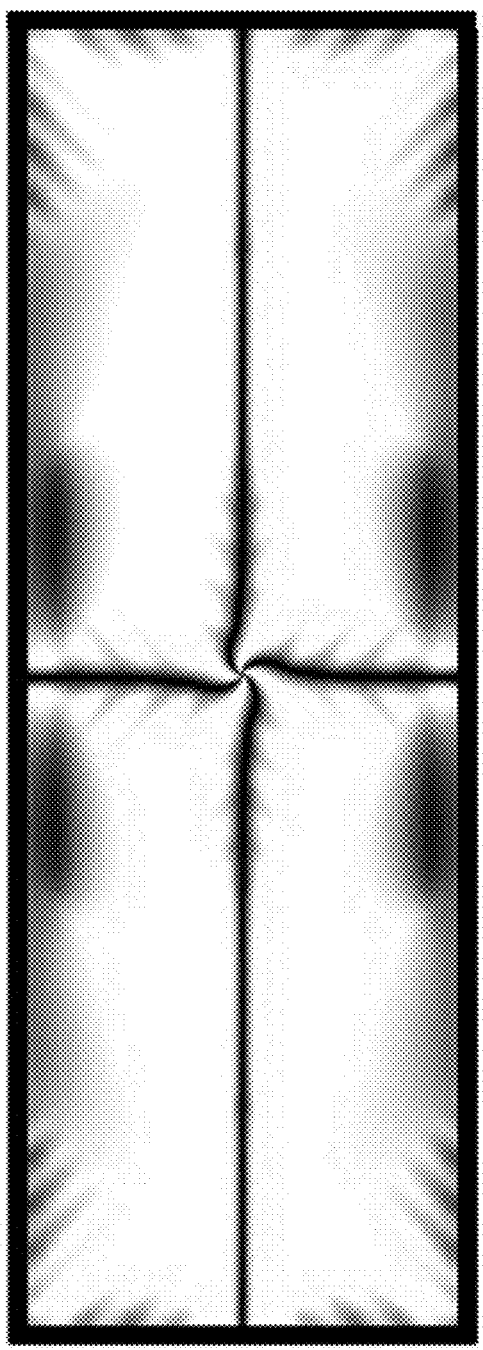
FIG. 9 is an image of one pixel according to an Example.

Next, FIG. 9 is an image for one pixel according to the Example of the present disclosure, and unlike FIG. 8, it can be seen that separate texture is not generated even at the end of the minute branch region of the first subpixel electrode. The reason is that when the plate region overlapping with the minute branch region of the first subpixel electrode does not have the opening, the liquid crystal molecules do not collide with each other by forming the same directional tilt in each region.

FIGS. 10A and 10B are images for the Comparative Example including a cross stem and minute branches extended therefrom. In the Comparative Example, the pixel electrodes do not overlap with each other, and different voltages were applied to the subpixel electrodes, respectively.

FIG. 10A illustrating a flat panel display does not show separate texture, but like FIG. 10B, it can be seen that when misalignment of about 20 μm occurs, a loss of the transmittance is caused. That is, it can be seen that when the Comparative Example is applied to a curved display device and thus the misalignment occurs, the loss of the transmittance of about 15% or more is caused.

FIG. 11A is an image when one pixel according to the Example of the present disclosure is used in the flat panel display, and FIG. 11B is an image when the one pixel according to the Example of the present disclosure is used in the curved display device and misalignment of about 20 μm occurs. As described above, one pixel according to Example of the present disclosure, as illustrated in FIGS. 11A and 11B, it can be seen that even when the misalignment occurs, texture or deterioration of transmittance is not caused.

According to the Example of the present disclosure, even when one pixel is used in the curved display device, it can be seen that the display device with improved transmittance may be provided without the loss of transmittance.

Next, FIGS. 12A to 12C are images illustrating transmittance of one pixel according to the present disclosure depending on a voltage of the liquid crystal display. When voltages applied to the first region and the second region have a voltage ratio of about 0.9, the transmittance is illustrated in FIG. 12A at a low gray, FIG. 12B at a medium gray, and FIG. 12C at a high gray.

According to an example embodiment, when the voltages have a predetermined voltage ratio, one pixel divided into three regions may be provided, and as a result, a display device with improved side visibility and transmittance may be provided.

This can be seen even through FIGS. 13A to 13C. FIGS. 13A to 13C are Examples for a case where a ratio of the voltages applied to the first region and the second region is about 0.85, the transmittance is illustrated in FIG. 13A at a low gray, FIG. 13B at a medium gray, and FIG. 13C at a high gray.

According to an example embodiment, one pixel divided into three regions may be provided, and as a result, a liquid crystal display with improved side visibility and transmittance may be provided.

Next, referring to FIG. 14, FIG. 14 is a transmittance graph with respect to the Example of the present disclosure and the Comparative Example. In FIG. 14, it can be seen that a curve according to an example embodiment is formed to be closer to that of a graph of front side transmittance as compared with the Comparative Example. That is, as compared with the Comparative Example having a pixel structure as illustrated in FIGS. 10A and 10B, it can be seen that the Example o has a pixel structure with improved side visibility.

As such, like the liquid crystal display according to an example embodiment, a part of the first subpixel electrode 191a to which a relatively high voltage is applied is disposed in the first region R1, a part of the first subpixel electrode 191a to which a relatively low voltage due to a thickness of the passivation layer is applied is disposed in the second region R2. As a result, with respect to the same voltage value, it can be seen that transmittance may be divided into three different regions and changes in transmittance of three regions are sequentially generated.

That is, in the case of the liquid crystal display according to an example embodiment, it can be seen that one pixel area may be divided into three regions which have different luminance and are sequentially changed in the luminance. It can be seen that in the display device, transmittance and side visibility are improved.

While example embodiments have been described in connection with what is presently considered to be practical example embodiments, it is to be understood that the invention is not limited to the disclosed embodiments, but, on the contrary, is intended to cover various modifications and equivalent arrangements included within the spirit and scope of the disclosure, including the appended claims.

<Description of Symbols>

100: Lower panel 200: Upper panel

3: Liquid crystal layer 31: Liquid crystal molecule

110: First insulation substrate 210: Second insulation substrate

121: Gate line 171: Data line

What is claimed is:

1. A liquid crystal display, comprising:
a first insulation substrate;
a thin film transistor positioned on the first insulation substrate;
a first subpixel electrode positioned on the thin film transistor and to which a first voltage is applied;
a second subpixel electrode positioned on the thin film transistor and to which a second voltage is applied;
a second insulation substrate facing the first insulation substrate;
a common electrode positioned on the second insulation substrate and receiving a common voltage; and
a liquid crystal layer disposed between the first insulation substrate and the second insulation substrate,
wherein the first subpixel electrode includes a plate region and a minute branch region overlapping the plate region with a passivation layer between the plate region and the minute branch region, and the plate region and the second subpixel electrode are positioned on a same layer.

2. The liquid crystal display of claim 1, wherein:
the minute branch region includes
a horizontal stem,
a vertical stem orthogonal to the horizontal stem, and
first minute branches obliquely extended from the horizontal stem and the vertical stem.

3. The liquid crystal display of claim 2, wherein:
the plate region includes
a first plate portion and
a connection portion positioned on the same line as the vertical stem.

4. The liquid crystal display of claim 3, wherein:
an end of the vertical stem of the minute branch region is extended to coincide with one end of the connection portion of the plate region.

5. The liquid crystal display of claim 4, wherein:
a length of the vertical stem positioned in the second region is 30μm or less.

6. The liquid crystal display of claim 4, wherein:
a voltage difference from the common electrode is reduced in the order of the first region, the second region, and the third region.

7. The liquid crystal display of claim 1, wherein:
a plane of the second subpixel electrode and the plate region is a rectangle.

8. The liquid crystal display of claim 1, wherein:
the second subpixel electrode includes
a second plate portion and
a plurality of minute branches extended from the second plate portion.

9. The liquid crystal display of claim 8, wherein:
the connection portion is surrounded by the second plate portion.

10. The liquid crystal display of claim 1, wherein:
the first subpixel electrode and second subpixel electrode form one pixel area, and one pixel area includes
a first region in which the minute branch region of the first subpixel electrode and a part of the first plate portion overlap with each other,
a second region in which the rest of the first plate portion of the first subpixel electrode is positioned, and
a third region in which the second subpixel electrode is positioned.

11. The liquid crystal display of claim 1, wherein:
the plate region of the first subpixel electrode is positioned below the passivation layer, and the minute branch region of the first subpixel electrode is positioned on the passivation layer.

12. The liquid crystal display of claim 1, wherein:
the plate region and the minute branch region of the first subpixel electrode are connected to each other through a contact hole.

13. The liquid crystal display of claim 1, wherein:
the first voltage is larger than the second voltage.

* * * * *